Dec. 14, 1926.  1,611,078
F. W. ROBSON
CONSTRUCTION OF VEHICLES
Filed Sept. 25, 1926   3 Sheets-Sheet 2
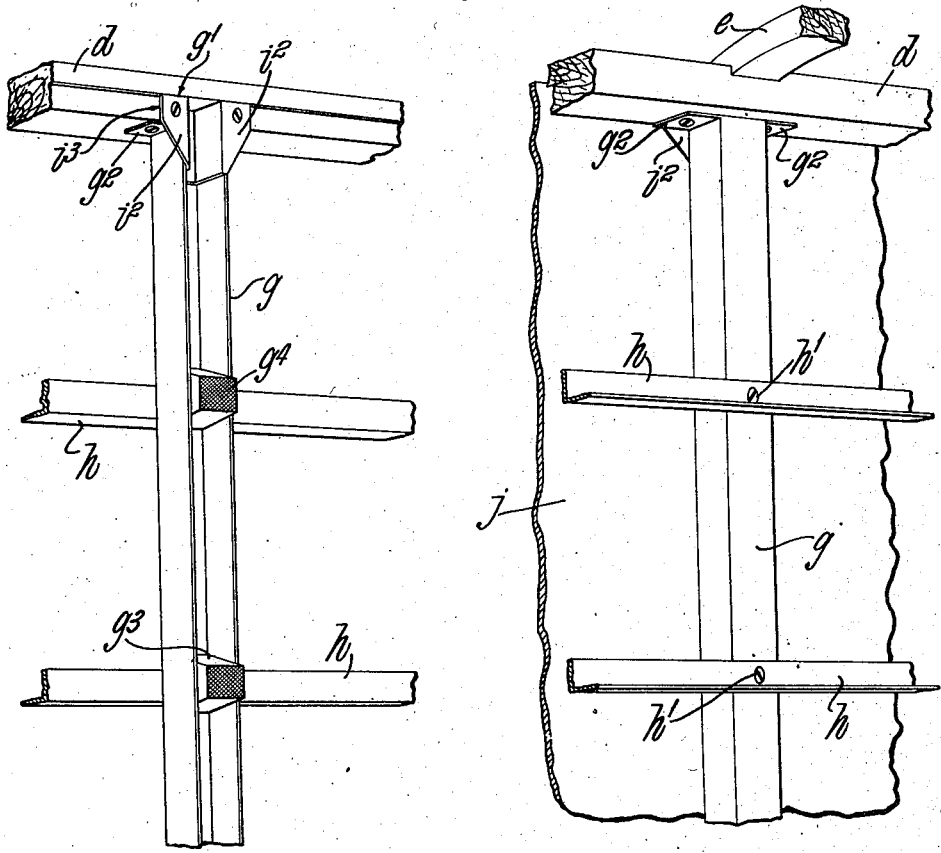
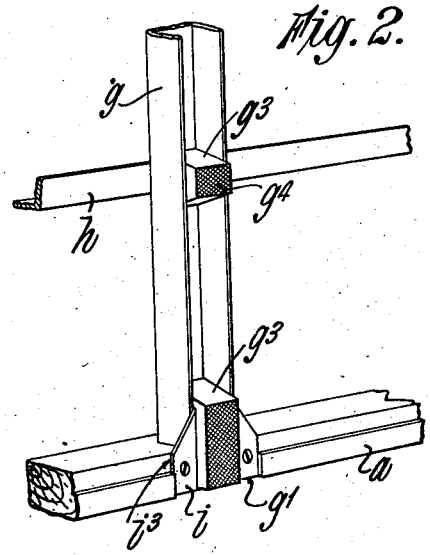
Fig. 2.
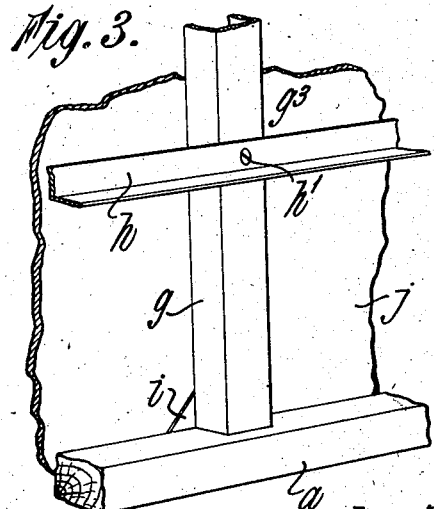
Fig. 3.
Inventor:
FRANK WILLIAM ROBSON.
Attorney:

Dec. 14, 1926.  
F. W. ROBSON  
1,611,078  
CONSTRUCTION OF VEHICLES  
Filed Sept. 25, 1926   3 Sheets-Sheet 3

Inventor:  
FRANK WILLIAM ROBSON  
ATTORNEY:

Patented Dec. 14, 1926.

1,611,078

UNITED STATES PATENT OFFICE.

FRANK WILLIAM ROBSON, OF LONDON, ENGLAND, ASSIGNOR TO WM. & THOS. ROBSON LIMITED, OF LONDON, ENGLAND, A BRITISH COMPANY.

CONSTRUCTION OF VEHICLES.

Application filed September 25, 1926, Serial No. 137,761, and in Great Britain March 25, 1925.

This invention relates to the construction of vehicles and more particularly to the body work of commercial road vehicles, such as box vans, certain embodiments of the invention being especially applicable to vehicles used for the conveyance of articles in trays or other removable supports such as are commonly employed by purveyors of food.

The invention is however generally applicable to the construction of vehicle bodywork, the production of a body and associated parts of light weight, combined with great strength being the main object of the invention.

The invention comprises improvements in the erection and building up of the bodies, including novel means for attaching vertical light metal standards to base timbers or frames and cant rails or equivalents and roof timbers, and in novel methods of connecting light metal horizontal members such as raves, runners or connectors to the standards, such novel methods permitting the use of simple wood screws throughout and also permitting the attachment of exterior panelling or the like and constituting as a whole simple methods of joining together the components and at the same time avoiding certain well known difficulties such as the use of bolts and loosening of their heads and nuts and the stretching of the heads where rivets are used.

The invention involves the use of light metal standards and similar connecting members interconnected to build up a body structure to which panelling or other enclosure may be attached and according thereto the framing structure comprises light metal standards of I, H angle channel or like section and metal connecting elements of similar section secured to flat surfaces of said standards either inside or in the same plane as said standards, the latter containing or supporting make-up or filling pieces of wood or other non-metallic substance to which the connecting members are secured by means of wood screws entering said filling pieces.

The invention also comprises other features of construction, arrangement and combination of parts hereinafter fully described with reference to the accompanying drawings.

In said drawings, all of which are perspective views:—

Fig. 2 shows a metal standard with raves or runners illustrating methods of connection and attachment to base timbers or members and cant rails.

Fig. 3 is a view from the opposite side of Fig. 2 showing exterior panelling.

In the embodiment shown in Figs. 1 to 4 the base members consisting of the main side members $a$ and end members $b$ with longitudinal intermediate members $c$ and intermediate transverse members where provided, are preferably formed of light timber, such as ash, strengthened with metal plates such as of steel where necessary.

The cant rails $d$ and roof supports $e$ where a closed vehicle is concerned are also formed similarly to the base members and the flooring proper (not shown) and roof $f$ may be conveniently formed of ply wood armoured and fabric covered respectively.

Figure 1:
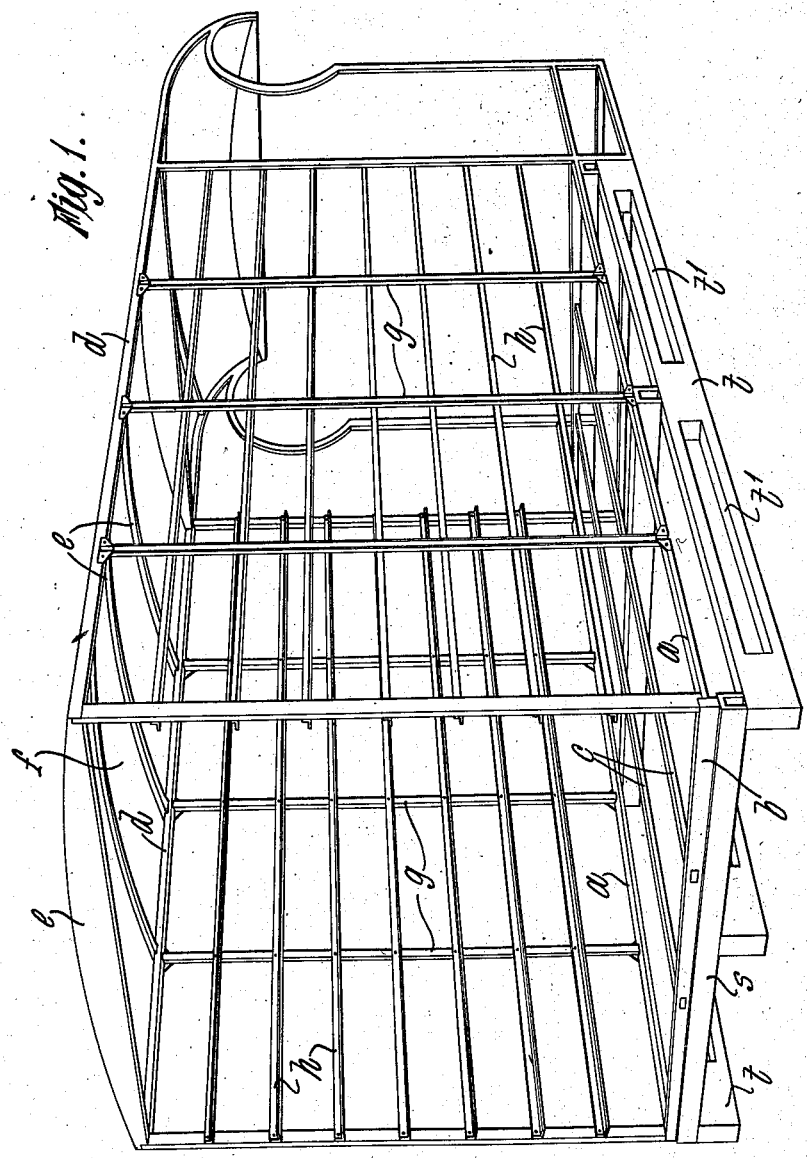
Fig. 1 is a view of the framing of a box van constructed according to this invention.
Figure 4:
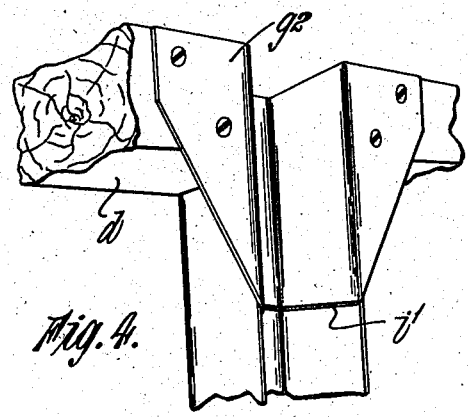
Figs. 4, 5 and 6 show methods of connecting vertical standards to cant rails

In the construction of the side framing or general upright or vertical work the said parts are built up of light vertical standards $g$ preferably of channel section such as steel, iron or other metal, a suitable material therefore being that sold commercially under the name of "Duralumin" and horizontal raves, runners or connectors $h$ of light angle or channel section, the former being shown in Figs. 1 to 3.

The said channel standards $g$ are mounted between the main side timbers $a$ and the cant rails $d$ with the plain or flat side inwards, that is to say, with the channel outwards and their lower ends may be attached to said timbers $a$ by recessing them thereinto to lie flush on the exterior as indicated at $g^1$, Fig. 2, with metal gusset plates $i$ to stiffen and secure them in position, the inner parts of the gusset plates being suitably sunk into the channels as at $i^1$ (Fig. 2 upper part) and secured thereto. The upper ends of the standards are also attached to the cant rails $d$ with the aid of gusset plates $i^2$ which both above and below are rebated into the timbers as at $i^3$ to allow the body panelling $j$ to lie flush and the upper ends of the vertical channels $g$ are conveniently split and bent back as at $g^2$ to enable them to be secured to the cant rail at each side (Fig. 2), or as in Fig. 4 the upper ends of the standards may be recessed into the cant rails similarly to the lower ends into the side timbers.

The horizontal members such as raves or runners $h$ are attached to the flat sides of the standards $g$ by screws $h^1$. Said horizontal members may be either of angle or channel section and, while forming part of the light body structure itself, may be used directly as runners for removable trays or supports for articles to be transported, instead of said runners being constituted by members quite separate from the body structure as in the usual constructions. Screw connection is used between the standards and raves or runners and the screws are countersunk into the metal to allow the runners to accommodate sliding trays or the like without obstruction.

The body framing described is suitably covered with panelling of light metal, such as aluminium or other material, and to prevent the panels from chattering against the standards $g$ the latter are provided within the channels thereof with slightly projecting packing blocks $g^3$ of wood or the like at suitable places, faced with felt or other soft material $g^4$ to provide cushioning means for the panels. Where said packing blocks are used the raves or runners are attached to the standards by wood screws with the heads preferably countersunk into the runners.

Figure 5:
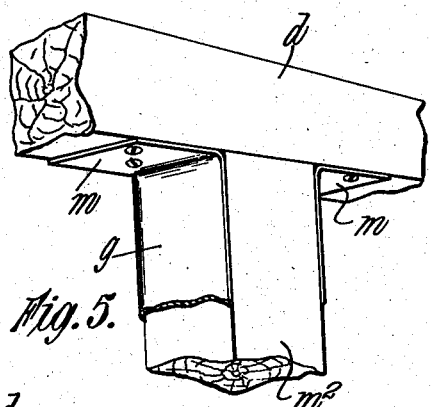
Figure 6:
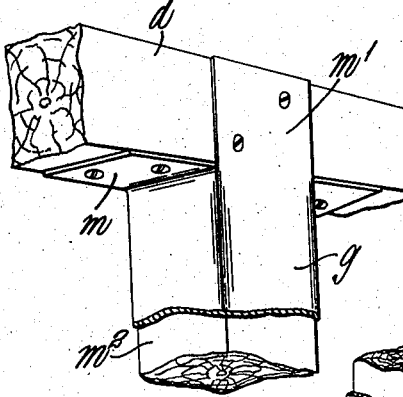

In the alternative or modified forms of connection shown in Figs. 5 and 6 the standards $g$ are attached to the cant rail $d$ and main side members by connecting them thereto to lie flush on the exterior (Fig. 6), and the top of the standard which contains make up pieces $m^2$ of wood or other nonmetallic substance is split or cut so that the sides thereof may be bent at right angles or horizontally to form flaps $m$ which are secured, by wood screws, to the cant rail, the back or remaining vertical part $m^1$ of the standard (Fig. 6) being similarly secured to the inner face of the cant rail. The lower ends of the standards are attached to the main side members by being lapped or recessed into the timber of said rail to allow the body panelling to lie flush, or the said lower ends may be conveniently split or cut, bent back and attached similarly to the upper ends as above described.

Figure 7:
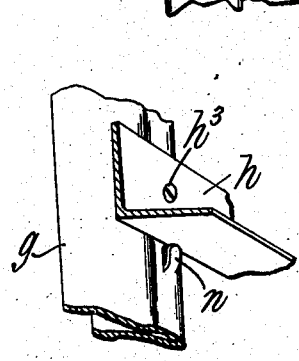
Figs. 7, 8, and 9 show alternative methods of connecting horizontal members such as raves or runners to vertical standards.

In the embodiment shown in Fig. 7 of a connection between a vertical channel standard $g$ and a horizontal runner, rave, or connector $k$, the attachment is effected by wood screws $h^3$, countersunk, screwed into a make-up or filling piece, in the channel of the standard and into the metal of the runner for instance to allow the runners to accommodate sliding trays without obstruction. The standard is provided with supporting shoulders $n$ at intervals suitably struck up or pressed out from the metal thereof on the rear face of the channel of the standard to form abutments on which the vertical thrust or weight of the horizontal member may be taken.

Figure 8:
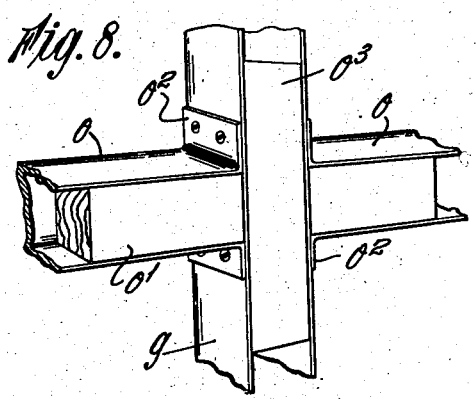
Figure 9:
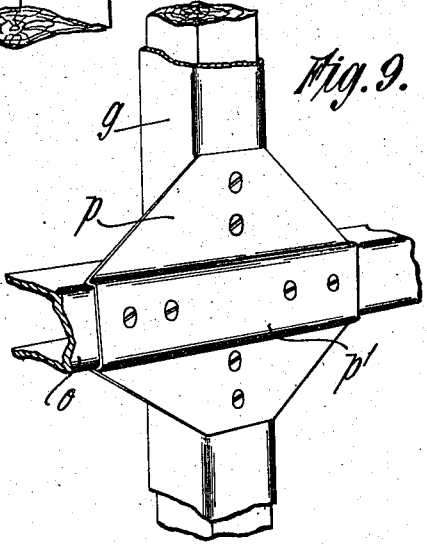

Figs. 8 and 9 show improved or modified forms of connection between the vertical standards $g$ and raves or horizontal members for vehicles required for the general carrying of goods and not necessarily in trays on runners. In this case said horizontal members $o$ are of channel section lapped on to the standards and are lined with a make-up piece of wood $o^1$ such as ash, or other appropriate material, except at the part which is immediately opposite the standard $g$, a space being left clear in front of each standard of the exact width of the latter in order to allow the horizontal member be lapped on. Two sides of each horizontal member are split or cut to permit of flaps $o^2$ being bent back at each side at right angles so that said member can be slipped onto the standard and secured by wood screws, countersunk into the flaps and passing through holes in the standards into a wood or like make-up or filling $o^3$ in the standard. The rear or uncut portion of the channel of the horizontal member will be the only portion extending beyond the plane of the standard at the rear and this portion permits the connection of the horizontal member to a number of standards as a complete unit and also acts as an edge plate.

At the point where the standards $g$ and horizontal members $o$ cross or intersect, a substantially rectangular or octagonal plate $p$ (Fig. 9) cranked or off set horizontally as at $p^1$ so that it fits over the horizontal member may be attached, by screws, to the standard and horizontal member respectively, being suitably screwed into wooden or nonmetallic make-up pieces $o^1$, $o^3$ within the channels of respective members.

As an alternative to the structure just described the horizontal member may be formed of metal bar or channel section of a depth considerably greater than its thickness or width and screwed with or without lapping as described to the back of the standards.

The make-up fillets of timber or other material employed can then be screwed to said bar or channel between the standards.

To again refer to Fig. 1, the body may be mounted on transverse members $s$ at suitable intervals, reinforced at their outer ends with metal of channel section and acting as bearers, which in turn are carried by longitudinal runners $t$ of wood, metal, or other material which are considerably lightened by cutting away portions thereof as at $t^1$ at places which do not take the major stresses imposed on them.

From the above description it will be apparent that in a vehicle having I, H, channel, angle or other like light metal sections adapted to resist bending and buckling stresses, make-up pieces of wood or other suitable non-metallic material are employed attached to the light sections and having other parts, such as raves, runners and panels, attached as by wood screws screwed into the make-up pieces.

The horizontal members fitted to the standards have counter-sunk holes to receive the heads of wood screws, which may pass through clearance holes in a wall of the channel-section standard and which are screwed into the wooden make-up pieces. The make-up pieces may be held in place in the light sections by wood screws which pass through parts of the light sections and screw into the make-up pieces.

It will be seen that such a construction considerably facilitates the erection and maintenance of the body, since there are no inaccessible nuts or rivet heads to stretch and the heads of the screws are easily accessible.

Raves of suitable section may be fitted either to supplement or replace the runners, using wood screws, screwed into the make-up pieces, and these raves may themselves be of light sections having make-up pieces to which the panels are attached, or the panels may be attached to the make-up pieces in the standards by wood screws.

It is preferred that the raves lie in the same plane as the standards but they may in fact cross them inside the standards.

It will be seen that the method of attachment which has been described is particularly suitable for use with parts made of aluminium or aluminium alloys, since in these soft materials ordinary means of attachment such as rivets or bolts and nuts, are apt to work loose.

What I claim as my invention and desire to secure by Letters Patent of the United States is:—

1. A vehicle body framing structure comprising light metal standards of angular section and metal connecting elements of similar section secured to flat surfaces of said standards, lower and upper horizontal members to which the standards are connected in such maner as to lie flush on the exterior for attachment of an outer covering structure, and gusset plates connecting the ends of the standards to the horizontal members, said gusset plates being recessed into said members.

2. A vehicle body framing structure comprising light metal standards of angular section and metal connecting elements of similar section secured to flat surfaces of said standards, filling pieces of non-metallic material supported by the standards and to which the connecting elements are secured by means of screws entering said filling pieces, and an outer covering structure secured to the non-metallic filling pieces by means of screws.

3. A vehicle body framing structure comprising light metal standards of angular section and metal connecting elements of similar section secured to flat surfaces of said standards, filling pieces of non-metallic material supported by the standards and to which the connecting elements are secured by means of screws entering said filling pieces, to lower and upper horizontal members, gusset plates connecting the ends of the standards to the horizontal members and recessed into said members to lie flush on the exterior, and an outer covering structure secured to the non-metallic filling pieces by means of screws.

In witness whereof I have signed this specification.

FRANK WILLIAM ROBSON.